Figures 1, 3, 4:
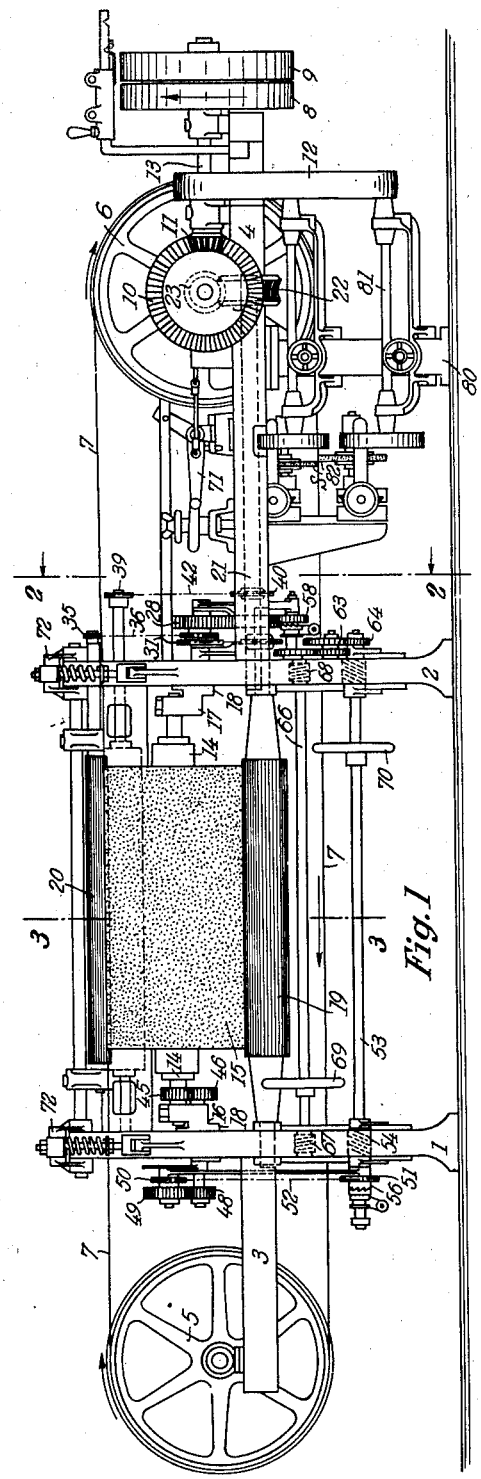

Dec. 19, 1933.  E. SCHMID  1,940,105
METHOD OF AND APPARATUS FOR MANUFACTURING COMPOSITION CORK SHEETS
Filed Oct. 29, 1931  3 Sheets-Sheet 1

Ernst Schmid
*Inventor:*
By [signature]
his ATTY.

Dec. 19, 1933.  E. SCHMID  1,940,105
METHOD OF AND APPARATUS FOR MANUFACTURING COMPOSITION CORK SHEETS
Filed Oct. 29, 1931  3 Sheets-Sheet 2
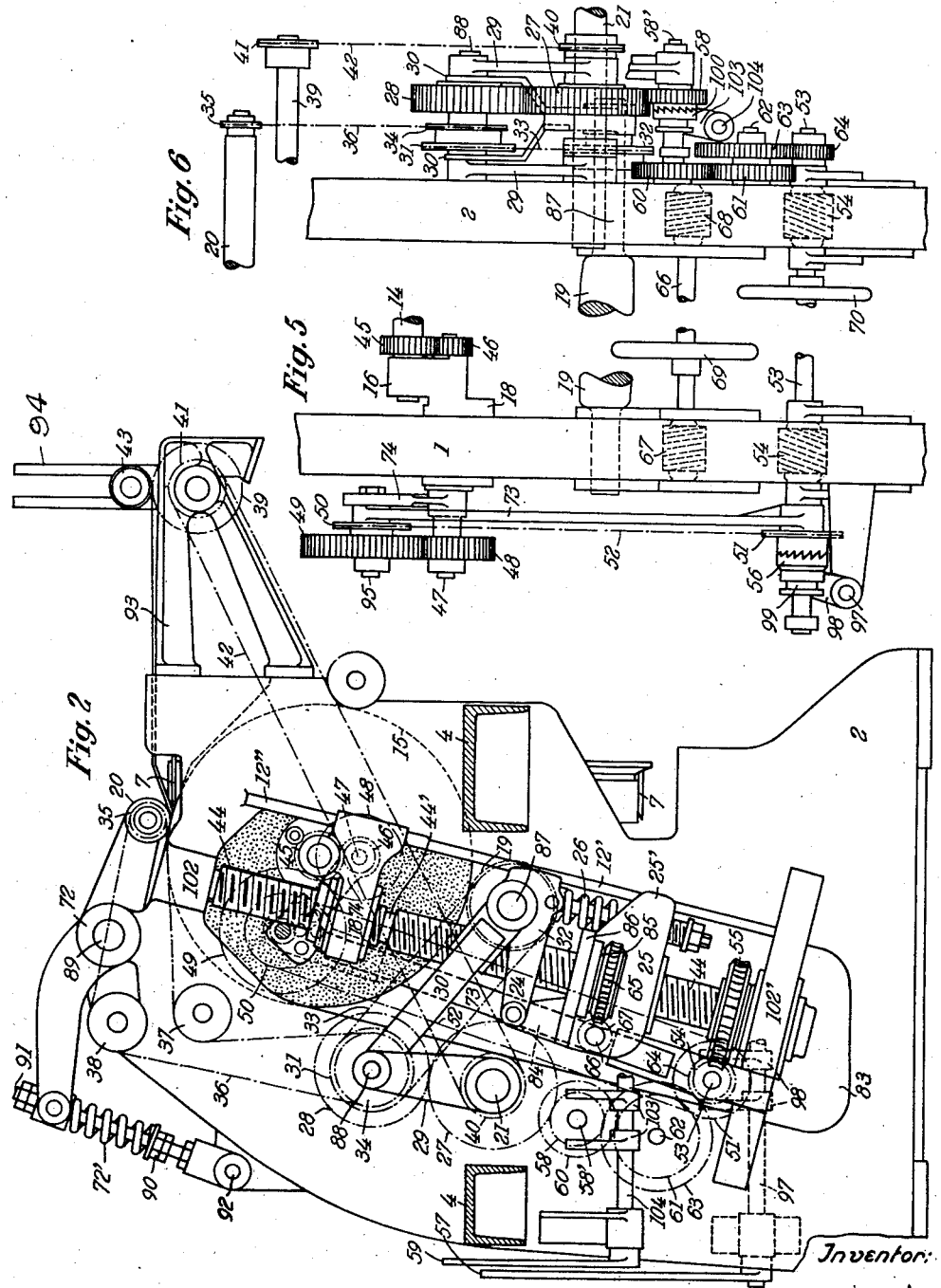
Inventor:
Ernst Schmid
By Otto Munk
his ATTY.

Dec. 19, 1933.   E. SCHMID   1,940,105
METHOD OF AND APPARATUS FOR MANUFACTURING COMPOSITION CORK SHEETS
Filed Oct. 29, 1931   3 Sheets-Sheet 3
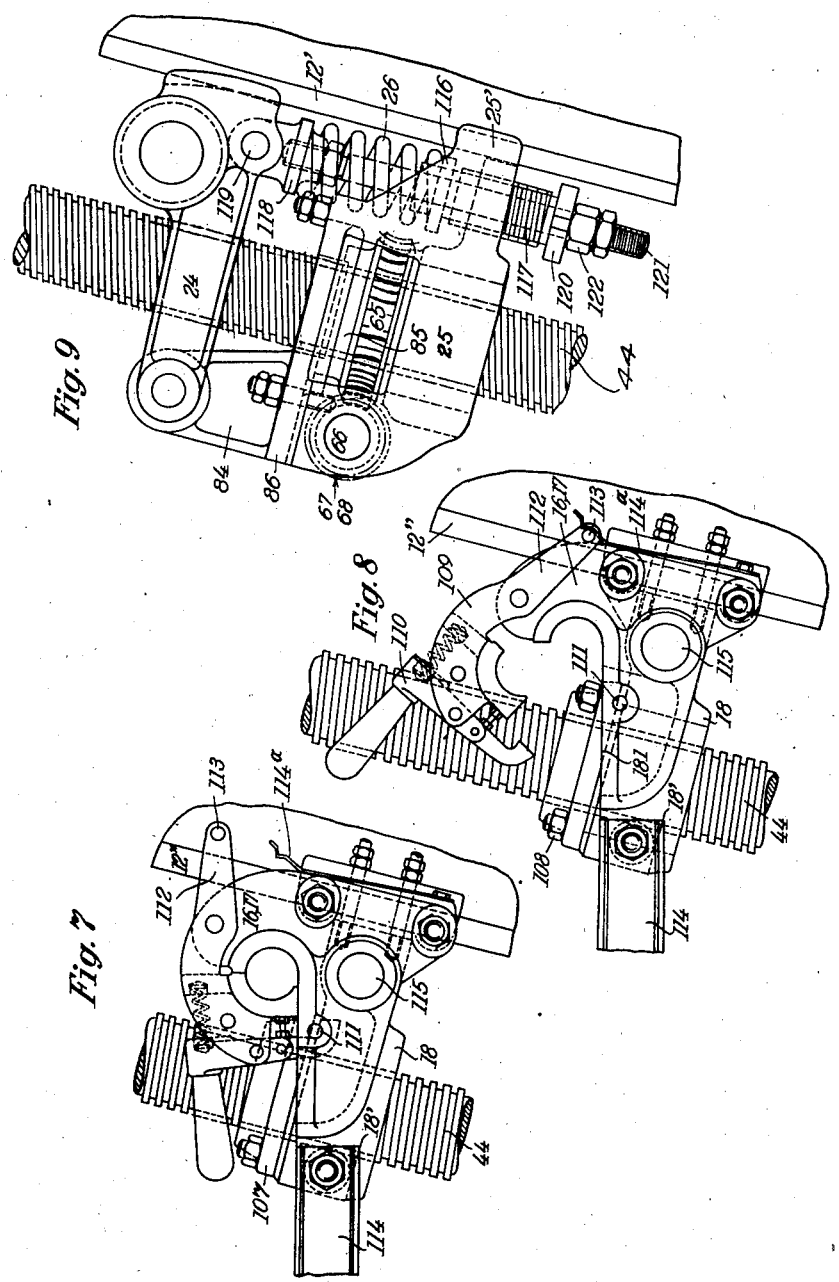
Inventor:
Ernst Schmid Patented Dec. 19, 1933

1,940,105

UNITED STATES PATENT OFFICE 1,940,105

METHOD OF AND APPARATUS FOR MANUFACTURING COMPOSITION CORK SHEETS

Ernst Schmid, Durlach, Germany, assignor to Badische Maschinenfabrik & Eisengiesserei vormals G. Sebold und Sebold & Neff, Durlach, Germany Application October 29, 1931, Serial No. 571,738, and in Germany January 23, 1931

15 Claims. (Cl. 144—209)

My invention relates to improvements in apparatus for cutting or slicing sheets from a cylindrical body, for example a body of composition cork, supported on a shaft and rotated in relation to a cutting edge. One of the objects of the invention is to provide an apparatus by means of which sheets of any desired width and thickness, and of indefinite length may be cut from the said body with a smooth cut and uniform thickness. With this object in view my invention consists in supporting the said body on a cylindrical core the diameter of which is equal to the inner diameter of the body, so that the said body is securely held thereon. I have found that when thus supporting the body the cutting pressure is uniform, so that thin sheets may be cut from the body which are uniform in thickness. Further, the body may be cut down to a small thickness so that the waste of material is reduced to a minimum.

In order to obtain a uniform thickness throughout the length of the sheet, the body of composition cork is automatically moved toward the cutting blade in accordance with the desired thickness of the sheet.

The rotary movement may be imparted to the body by rotating the said core or shaft supporting the same, and I prefer to regulate the said rotary movement so that the circumferential velocity of the body remains constant though the said body is gradually reduced in diameter. In the preferred construction I use the said core only for supporting the body, and I impart the rotary movement to the body by means engaging the circumference of the body. Such means may be in the form of one or more rollers having a rough surface, so that they are adapted to carry along the cork body by friction. The said roller or rollers are automatically advanced toward the body and the cutting blade. Preferably one of the said rollers is located diametrically opposite to the edge of the cutting blade, and in this case the roller is advanced for each rotation of the body a distance corresponding to two thicknesses of the sheet to be cut.

Another object of the invention is to provide means for winding the cut sheet on a shaft or core, the said shaft or core and the sheet being wound thereon having the same circumferential velocity as the body from which the sheet is cut. For this purpose the reeled sheet is circumferentially engaged by a roller the circumferential velocity of which is equal to the velocity of the cut.

Immediately in front of the cutting edge there is a pressure roller the circumferential velocity of which is likewise equal to that of the body, the said roller compacting the body at its surface and forcing the same toward the blade.

I have stated above that I may use one or more rollers, and where a single roller is provided I may dispose the same immediately in front of the cutting blade so that it has the combined action of feeding the body and compacting the same at its surface.

Another object of the invention is to provide an apparatus in which means are provided for varying the thickness of the sheet being cut. Further, an object of the invention is to provide means for returning the parts to initial position after cutting a body of cork into a sheet. For this purpose means may be provided for reversing the operating mechanism of the machine, or a separate driving mechanism may be provided.

Other objects of the invention will appear from the following description.

For the purpose of explaining the invention a form thereof is shown in the accompanying drawings as embodied in a machine for slicing or cutting sheets from a body of composition cork. In said drawings, Fig. 1 is an elevation showing the machine, Fig. 2 is a sectional elevation taken on the line 2—2 of Fig. 1, Fig. 3 is a detail sectional elevation taken on the line 3—3 of Fig. 1 and showing the body of composition cork at the beginning of the cutting operation, Fig. 4 is a similar sectional elevation showing the body of composition cork near the end of the cutting operation, the sheet being wound on a shaft, Figs. 5 and 6 are detail views showing the driving mechanism, on an enlarged scale.

Fig. 7 is a detail elevation showing one of the bearings in which the drum or shaft carrying the body of composition cork is mounted, the hinged top of the said bearing being closed, Fig. 8 is a similar elevation showing the bearing open, and Fig. 9 is a detail elevation showing one of the blocks in which the roller for rotating the body of composition cork is mounted.

In the example shown in the drawings the machine comprises two uprights 1 and 2 having horizontal beams or frames 3 and 4 respectively secured thereto, and an upright 80. On the uprights 1 and 2 a shaft or core 14 is mounted which provides a support for the cylindrical body 15 of composition cork. Further, on the said uprights rollers 19 and 20 are mounted, which are in frictional engagement with the body 15. On the beams or frames 3 and 4 wheels 5 and 6 are mounted over which an endless steel band 7 is trained which is formed with an edge for slicing the body 15. On the upright 80 the driving mechanism for a grinding apparatus S for the cutting edge of the band 7 is mounted.

The wheel 6 is driven by belt mechanism comprising a shaft 13 mounted on the frame 4 and carrying a fixed pulley 8 and an idle pulley 9, the rotary movement of the said shaft being transmitted to the wheel 6 through a bevel-gearing 10, 11. The upper reach of the band 7 is guided between the uprights 1, 2 and close to the body 15 between two guide plates 7', 7" secured to the uprights 1, 2.

From the shaft 13 a shaft 81 is rotated by means of a belt gearing comprising a belt 12, and the said rotary movement of the shaft 81 is transmitted to the grinding mechanism S comprising a pair of emery disks 82. Such grinding mechanism is known in the art, and I deem it unnecessary to describe the same in detail.

Preferably the shaft or core 14 is tubular in shape in order to reduce the weight thereof. The cylindrical body 15 fits closely on the said core, as is best shown in Fig. 3, and it is held thereon by friction or, if desired, by means of a suitable binding medium. The core 14 is rotatably mounted in bearings 16, 17 which are secured to or made integral with blocks 18 located in cut-out portions 83 of the uprights 1 and 2 and guided on guide ways 12" provided on the said uprights. The said blocks are adapted to be moved upwardly and downwardly and in a direction for moving the core 14 and the body 15 mounted thereon towards and away from the blade 7, by means of screw-threaded spindles 44 mounted in bearings 102 and 102' fixed to or made integral with the uprights 1 and 2 and engaging in internally screw-threaded sleeves 107 fitted in bores of the block 18 and fixed thereto by means of screws 108. The bearings 16 and 17 have hinged tops 109 carrying spring-pressed latches 110 adapted to engage pins 111 for locking the tops in closed position. The tops are made integral with arms 112 carrying lugs 113 adapted to be engaged by springs 114a adapted to arrest the tops in open position as is shown in Fig. 8. The blocks 18 are formed with inclined faces 181 disposed tangentially of the bores of the bearings 16, 17 and in alignment with the said faces channel irons 114 are secured to the blocks 18. If it is desired to place the core 14 carrying a block 15 into the bearings 16, 17, the said core is first supported on the channel irons 114 and moved on the same into the bearings 16, 17. In a similar way the surfaces 181 and the channel irons 114 may be used for removing the core from the bearings.

One of the blocks 18 and bearings 16, 17 is formed with an eye 115 in which a shaft 47 is mounted as will be described hereinafter. The mechanism for operating the spindles 44 will be described hereafter.

In the construction shown in the drawings rotary movement is imparted to the body 15 by mechanism engaging the same circumferentially, and as shown I have provided the rotary roller 19 which engages the body 15 at the bottom part thereof and preferably diametrically opposite to the edge of the blade 7. In addition I have provided a second roller 20 which engages the body 15 at its top, and which is located close to the cutting edge of the blade 7, the object of the said roller being to rotate the body 15 and to compact the same at its surface and to feed the material towards the blade 7.

The rollers 19 and 20 have rough surfaces, and preferably they are milled. The roller 19 is supported at both ends in bearings 24 rockingly supported on brackets 84 rising from slide blocks 25. As shown the blocks 25 are U-shaped, and to the upwardly directed shanks plates 86 are secured which carry the brackets 84. In the recesses 85 worm-gears 65 are located the hubs of which are in threaded engagement with the spindles 44. The blocks 25 are formed with flanges 25' engaging the guide ways 12'. The bearings 24 are yieldingly supported on the blocks 25 by means of coiled springs 26 located between flanges 116 of screw-threaded plugs 117 and blocks 118 rockingly mounted on the bearings 24 at 119. The plugs 117 are formed with heads 120 by means of which they may be screwed inwardly and outwardly for varying the tension of the spring 26. Screw-threaded spindles 121 are fixed to the blocks 118 and extend through axial bores of the plugs 117. The said spindles carry nuts 122 bearing on the heads 120. Thus by screwing the plugs 117 inwardly or outwardly and thereafter screwing the nuts 122 on the spindles 121 and into engagement with the heads 120, the springs 26 may be put under the desired tension. By means of the blocks 25 and the spindles 44 the bearings 24 of the roller 19 are moved upwardly and downwardly for forcing the roller 19 into frictional engagement with the body 15 or retracting the same therefrom.

For imparting rotary movement to the roller 19 the following mechanism is provided: One of the trunnions 87 of the roller 19 is engaged by a pair of links 30 which are jointed at 88 to a pair of links 29 loosely mounted on a shaft 21 mounted on the upright 2 and on the frame 4. The shaft 21 carries a worm-gearing 22 which is adapted to be coupled therewith by a clutch (not shown), and which is in engagement with a worm 23 secured to the shaft carrying the bevel-gear-wheel 10. To the shaft 21 a gear-wheel 27 is keyed which is in mesh with a gear-wheel 28 secured to the pivot-bolt 88, and to the said pivot-bolt a sprocket gearing 31 is secured which is connected by a chain 33 with a sprocket wheel 32 secured to the trunnion 87 of the roller 19. By thus disposing yielding members of the operating mechanism on the links 29, 30 the roller 19 may follow the reduction of the diameter of the body 15 without the operation of the roller 19 being interrupted.

The upper roller 20 is mounted on a pair of levers 72 rockingly mounted on a shaft 89 supported on the uprights 1 and 2, and the said levers 72 are engaged by springs 72' tending to force the roller 20 into engagement with the body 15. As shown, means are provided for adjusting the tension of the springs 72', the said springs being supported on nuts 90 threaded on bolts 91 supported on the uprights 1 and 2 at 92.

To the pivot bolt 88 a second sprocket wheel 34 is secured the chain 36 of which is trained over a sprocket wheel 35 connected with the pressure roller 20, the said chain being guided over idle rollers 37 and 38. The roller 37 is yieldingly mounted by means not shown, so that the chain 36 may follow the movement of the bolt 88 when the roller 19 is shifted from one end position into the other one.

To the shaft 21 a sprocket wheel 40 is secured which is connected by a chain 42 with a sprocket wheel 41 secured to a roller 39 mounted on brackets 93 secured to the uprights 1 and 2. On the said brackets guide members 94 are mounted in which the bearings of a roller 43 are guided which is adapted to have the cork sheet wound thereon, as is shown in Figs. 3 and 4.

The diameters of the gear-wheels are such that the milled rollers 19 and 20 and the roller 39 have equal circumferential velocities.

The mechanism for imparting rotary movement to the spindles 44 is constructed as follows:

To the lower ends of the said spindles worm gearings 55 are secured which are in engagement with worms 54 carried by a shaft 53 mounted in the uprights 1 and 2. On the said shaft a sprocket wheel 51 is loosely mounted which is adapted to be connected with the shaft 53 by means of a clutch 56. In the construction shown in the drawings the said sprocket wheel 51 is driven from the core 14. To the said core a gear-wheel 45 is secured which is in mesh with a gear-wheel 46 carried by a shaft 47 supported on and extending through an eye 115 of the block 18. On the outer end of the said shaft 47 a link 74 is loosely mounted which is jointed by means of a pivot bolt 95 to a link 73 loosely mounted on the shaft 53 (Fig. 5). To the shaft 47 a spur gear 48 is secured which is in mesh with a spur gear 49 mounted on the pivot bolt 95. With the spur gear 49 a sprocket wheel 50 is connected which is connected by a chain 52 with the sprocket wheel 51. By reason of the links 73, 74 supporting a part of the driving mechanism for the shaft 53 the core 14 may be moved upwardly without interfering with the transmission of power to the shaft 53.

The gear-wheels 48 and 49 are change wheels, so that the rotary movement of the spindles 44, and therefore the movement of the body 15 towards the blade 7 and the thickness of the sheet being cut may be varied at will. The higher the velocity of the spindle 44 is as compared to the rotary speed of the body 15, the thicker is the sheet sliced from the body, and vice versa. The coupling member 56 is controlled by hand-operated mechanism including a shaft 97 carrying arms 98 engaging in a circumferential groove 99 of the hub of the coupling member, and a hand-operated arm 57.

By the rotary movement of the spindle 44 the blocks 18 and 25 are moved upwardly and downwardly, and the pitch of the screw-threads of the spindle engaging the worm gearing 65 of the block 25 is double that of the screw-threads engaging the block 18. Therefore, while the body 15 is lifted for each rotation a distance corresponding to the desired thickness of the sheet, the roller 19 is lifted twice that distance, as is necessary for maintaining the same in engagement with the body 15.

The worm-gears 65 engaging the blocks 25 are engaged by worms 67 and 68, carried by the blocks 25, and to the worm shaft 66 a hand-wheel 69 is secured. By rotating the hand-wheel 69 the gears 65 may be rotated and the block 25 lifted or lowered on the spindle for varying the tension of the spring 26 independently of the rotary movement imparted to the spindle 44 by the core 14 through the intermediary of the worm-gears 55. In this manner the roller 19 may be pressed into engagement with the body 15 with a pressure sufficient for safely carrying along the said body by friction, which is particularly important at the beginning of the slicing operation, because initially the bodies 15 are not exactly cylindrical.

After the body 15 has been sliced, the core 14 and the roller 19 are returned to initial position by reversing the direction of rotation of the spindle 44. In the construction shown in the drawings separate mechanism is provided for this purpose, and the said mechanism is operated from the shaft 21 as follows:

The gear-wheel 27 by means of which rotary movement is imparted to the roller 19 is in mesh with a second gear-wheel 58 loosely mounted on a shaft 58'. The said gear-wheel 58 is adapted to be connected with or disconnected from the shaft 58' by means of a coupling member 100 controlled by a hand lever 59 keyed to a shaft 104, the said shaft carrying arms 103 engaging in a circumferential groove of the hub of the coupling member 100. To the shaft 58' a gear-wheel 60 is secured which is in mesh with a gear-wheel 61 mounted on a shaft 62. To the shaft 62 a gear-wheel 63 is secured which is in mesh with a gear-wheel 64 secured to the shaft 53 carrying the worms 54. The rotary movement imparted by this mechanism to the spindle 44 is the reverse of that imparted thereto from the core 14 through the mechanism 45, 46, 48, 49, 52 and 51, and the gear ratio of the mechanism is such that the return movement of the spindle 44 is performed at high velocity. It will be understood that while the spindle 44 is being rotated from the core 14 the mechanism connected with the gear-wheel 27 is disconnected from the shaft 53 by means of the coupling mechanism 100, and while the return movement is imparted to the said spindle through the intermediary of the gear 27 the sprocket wheel 51 is disconnected from the shaft 53 by means of the coupling member 56.

The operation of the machine is as follows:

It may be assumed that the blocks 18 and 25 have been screwed downwardly by means of the spindle 44, and that the core 14 having a body 15 of composition cork mounted thereon has been placed on the bearings 16, 17. Now the shaft 53 is disconnected from its driving mechanisms by means of the coupling members 56 and 100 and it is rotated by means of a hand wheel 70 secured thereto, until the body 15 bears on the roller 20 and the pressure of the roller on the said body is sufficient. Thereafter by means of the hand wheel 69 of the worm shaft 66 the worm gears 65 are rotated, until the driving roller 19 bears on the body 15 with sufficient pressure.

Now a lever 71 (Fig. 1) is rocked for closing the clutch connecting the gear-wheel 22 with the shaft 21. Therefore the said shaft is rotated, and such rotary movement is transmitted to the rollers 19, 20 and 39. By means of the hand lever 57 the clutch 56 controlling the automatic upward movement of the body 15 and the roller 19 is closed, so that the said parts are gradually moved upwardly.

The first part of the operation consists in removing the irregular parts of the surface of the body 15, for which purpose two or three rotations of the said body are needed. The irregular sheet of cork which is useless is cut from the regular sheet at the rear of the rollers 43 and 39, the machine being temporarily arrested for this purpose. The leading end of the regular sheet is secured to the roller 43. For example it is passed into a longitudinal slot thereof (not shown), whereupon the machine is started again. Thereafter a sheet of uniform thickness is sliced from the body 15, and the slicing is performed in the same way and without any trouble from the beginning to the end, because all the rotating bodies, and more particularly the body 15 of composition cork, its driving roller 19, the roller 43 on which the sheet is coiled, its driving roller 39, and the pressure roller 20 all rotate at the same circumferential velocity.

The thickness of the sheet of cork depends on the gear ratio of the change wheels 48, 49 which have been mounted on the machine, the said gear ratio controlling the feeding movement of the body 15 and the roller 19 towards the cutting edge of the blade 7. Of course, the thicker the sheet sliced from the body 15, the more quickly the slicing operation is completed and vice versa.

The sheet of cork is automatically wound on the roller 43 and the circumferential velocity of the reel being produced is the same as that of the body 15 being sliced, because the roller 39 has the same circumferential velocity as the roller 19 and the body 15, and the roller 39 transmits its movement to the circumference of the roller 43.

Preferably the roller 43 and its driving mechanism are arranged so that the sheet is wound thereon in a direction opposite to that in which it was on the body 15.

The body 15 rotates clockwise and the roller 43 rotates counter-clockwise. The sheet sliced from the body 15 is curved, its concave face being toward the body 15 and its convex face being on the outside, and as the sheet is wound on the roller 43 what was previously the convex outer face becomes the concave inner face and what was previously the concave face becomes the convex outer face.

Fig. 3 illustrates the beginning of the slicing operation. The spindles 44 and the guide ways 12', 12" are inclined from the vertical, and as a consequence the blade 7 acts at a favorable cutting angle insuring a smooth cut and a uniform thickness of the sheet.

Fig. 4 shows the position of the cylinder slightly before the end of the work. As shown, the body 15 has been sliced nearly to the periphery of the core 14, and accordingly the reel of sheet cork has a large diameter. Preferably the driving roller 39 has a smooth surface, in order to permit a certain sliding of the reel 43 on the roller 39.

After the slicing of the body 15 has been nearly completed, the rotary movement of the cylinder 15 and the movement of the spindle 44 are automatically interrupted by any suitable means (not shown).

Now the reel 43 is removed from the machine, and by means of the hand lever 57 the clutch 56 of the worm shaft 53 is opened. By means of the hand lever 59 the clutch 100 of the reversing mechanism, that is the gear 58, is closed, and thereafter the clutch for the worm gearing 22 is again closed. Now the shaft 21 is again rotated, and the core 14 and the roller 19 are returned to initial position. At the end of the said operation, and when the parts are again in initial position the gear wheel 22 is automatically disconnected from its driving mechanism, whereby the return movement of the parts is automatically completed.

Now the core 14 is removed from the machine, and a new body 15 is mouned therein. The operation is repeated in the manner described above.

I claim:

1. A machine for slicing sheets from a cylindrical body of relatively yieldable material, comprising a core adapted to support said body without rotation thereof in relation to said core, a blade in position for slicing the body placed on said core, means for moving said core towards and away from said blade, a roller adapted for frictional engagement with the body placed on said core, a supporting structure for said roller comprising a shaft fixed in space, a second shaft oscillatable in space about the first shaft, a third shaft carrying said roller and links interconnecting said several shafts, driving mechanism for imparting rotary movement to said roller, and means for moving said core and roller towards said blade.

2. A machine for slicing sheets from a cylindrical body of relatively yieldable material, comprising a core adapted to support said body without rotation thereof in relation to said core, bearings for said core, a blade in position for slicing the body placed on said core, a roller frictionally engaging the said body along a line disposed diametrically opposite to said blade, bearings for said roller, screw-threaded spindles engaging the bearings of said core and roller and adapted to shift the same towards and away from said blade, the pitch of the parts of the spindles engaging the bearings of the roller being double that of the parts of the spindles engaging the bearings of the core, and means for imparting rotary movement to said spindles.

3. A machine for slicing sheets from a cylindrical body of relatively yieldable material, comprising a core adapted to support said body without rotation thereof in relation to said core, bearings for said core, said bearings having movable portions to facilitate insertion of the core into and removal of the same from the bearings, a blade in position for slicing the body on said core, a roller frictionally engaging the body along a line disposed diametrically opposite to said blade, bearings for said roller, screw-threaded spindles engaging the bearings of said core and roller and adapted to shift the same towards and away from said blade, the pitch of the parts of the spindles engaging the bearings of the roller being double that of the parts of the spindles engaging the bearings of the core, and means for imparting rotary movement to said spindles.

4. A machine for slicing sheets from a cylindrical body of relatively yieldable material, comprising a core adapted to support said body throughout its length, a blade in position for slicing the body on said core, a roller adapted for frictional engagement with the body at a part opposite to said blade, means for imparting rotary movement to said roller, a frame on which said core, blade and roller are mounted formed with guide ways on which said core is movable towards and away from said blade, blocks slidable on said guide ways, rockable members mounted on said blocks and providing the bearings for said roller, springs intermediate said blocks and rockable members adapted to force said roller into engagement with said body, spindles engaging said blocks and the bearings of said rollers and adapted to move the same on said guide ways towards and away from said blade, and means for imparting rotary movement to said spindles.

5. A machine for slicing sheets from a cylindrical body of relatively yieldable material, comprising a core adapted to have such body mounted thereon and to engage the same with its whole surface, a blade in position for slicing the body on said core, a roller adapted for frictional engagement with the body on said core, a frame on which said blade, core and roller are mounted formed with a guide way on which said core and roller are movable towards and away from said blade, means for rotating said roller in a direction for rotating said body with relation to said blade, spindles mounted on said frame and engaging the bearings of said core and roller and adapted to shift the same towards and away from said blade, worm-gears secured to said spindle, worms in engagement with said worm-gears, driving mechanism connected with said worms and with said core for transmitting rotary movement from said core to said worms, and a joint comprising a plurality of links having one of its links mounted coaxially of said worms and the other link mounted coaxially of a member of said mechanism connected with said core, said mechanism including a member mounted coaxially of the central hinge of said joint.

6. A machine for slicing sheets from a cylindrical body of relatively yieldable material, comprising a core adapted to have such body mounted thereon and to engage the same with its whole surface, a blade in position for slicing the body on said core, a spring-pressed roller adapted to engage the body near said blade, a spring-pressed roller adapted for frictional engagement with said body at the side thereof opposite to said blade, means for imparting rotary movement to said frictionally engaging roller, automatic mechanism for feeding said core and said frictionally engaging roller, said feeding mechanism including a clutch, and hand-operated means for moving said frictionally engaging roller relatively to its feeding mechanism.

7. A machine for slicing sheets from a cylindrical body of relatively yieldable material, comprising a core adapted to have such body mounted thereon and to engage the same with its whole surface, a blade in position for slicing the body on said core, a spring-pressed roller adapted to engage the body near said blade, a spring-pressed roller adapted for frictional engagement with said body at the side thereof opposite to said blade, means for imparting rotary movement to said frictionally engaging roller, screw-threaded spindles engaging the bearings of said core and frictionally engaging roller, automatic driving mechanism including a clutch for rotating said spindles, worm gearings connected with the bearings of said frictionally engaging roller and screwing on said spindles, and hand-operated worms for rotating said worm-gearings.

8. A machine for slicing sheets from a cylindrical body of relatively yieldable material, comprising a core adapted to have such body mounted thereon and to engage the same with its whole surface, a blade in position for slicing the body on said core, a spring-pressed roller adapted to engage the body near said blade, a roller adapted for frictional engagement with said body at the side thereof opposite to said blade, means for rotating said frictionally engaging roller, a frame on which said core, blade and rollers are mounted, screw-threaded spindles mounted on said frame at opposite ends of said core and rollers and engaging the bearings of said core for moving the same towards and away from said blade, blocks mounted on said frame coaxially of said spindles, and having the bearings of said frictionally engaging roller rockingly mounted thereon, springs between said blocks and bearings adapted to press said roller into engagement with said body, worm-gearings screwing on said spindles and engaging said blocks for moving the same axially of said spindles and hand-operated worms on said blocks in engagement with said worm-gearings.

9. In a machine for slicing sheets from a cylindrical body of relatively yieldable material, the combination with a core adapted to support said body without rotation thereof in relation to said core, of a rapidly moving endless cutting band in position to slice sheets from said body on said core, means for rotating said body at a uniform circumferential speed toward said cutting band, take-up means to receive the cut sheet and means for rotating said take-up means at uniform speed equal to the said circumferential speed to wind the cut sheet into a coil the direction of winding being opposite to the direction in which the cut sheet comes from the said body.

10. In a machine for slicing sheets from a cylindrical body of relatively yieldable material, the combination with a core adapted to support said body without rotation thereof in relation to said core, of a rapidly moving endless cutting band in position to slice sheets from the periphery of the body on the core, means for rotating said body at a uniform circumferential speed toward said cutting band, a roller immediately in advance of the cutting edge of said cutting band and exerting no pressure on the latter, means for yieldingly pressing said roller against the surface of said body and means to rotate said roller in a direction to cause the same to cooperate in rotating the said body toward said cutting band.

11. A machine for slicing sheets from a cylindrical body of relatively yieldable material, comprising a rotatable core adapted to support said body without rotation thereof in relation to the core, an endless cutting band movable along a line of the periphery of said body, a rotatable roller adapted to rotate said body and engaging the latter at a line diagonally opposite the line at which the cutting band engages said body, and means for advancing said body and roller in parallelism along said diagonal toward said cutting band.

12. A machine for slicing sheets from a cylindrical body of relatively yieldable material, comprising a rotatable core adapted to support said body without rotation thereof in relation to the core, an endless cutting band in position to slice sheets from the periphery of said body, a roller engaging the periphery of said body diagonally opposite the engagement of the cutting means with the body, means to rotate said roller to impart rotary movement to said body, change gear wheels driven by the rotary movement of said body, means for advancing the roller and body toward said cutting means, and a chain and sprocket connection from said change wheels to said advancing means whereby the roller and body may be advanced together but at varying speeds.

13. A machine for the purpose specified, comprising the combination with the elements claimed in claim 12, of means including a worm shaft and worm wheels to return the body and roller to initial position at greater speed than their rate of advance.

14. A machine for slicing sheets from a cylindrical body of relatively yieldable material, comprising a rotatable core adapted to support said body without rotation in relation to the core, an endless cutting band movable in relation to the periphery of the body, a roller engaging the periphery of the body diagonally opposite the cutting band, means for rotating the roller to impart rotary motion to the body, a vertical guide at a point remote from said body, a take up roller supported for rotation in said guide and adapted to have the material sliced from said body wound thereon in a direction opposite to that in which the sliced material comes from the body, a pressure roll associated with the take up roller and engageable with the material wound on said take up roller and means for driving said take up roller and pressure roll at the same peripheral speed as said body.

15. A machine for slicing sheets from a cylindrical body of relatively yieldable material, comprising a core adapted to support said body without rotation in relation to the core, a roller pressing yieldingly against the lower part of said body, an endless cutting band positioned to slice material from said body at a point opposite said roller, a second roller engaging said body in close juxtaposition to said cutting band, means for forcing said second roller into yielding engagement with said body, a take up roller to receive the material sliced from said body, means for rotating the first named roller to impart rotary motion to said body and means for rotating the second roller and take up roller from said body at the same circumferential speed as said body.

ERNST SCHMID.